(12) United States Patent
Tan

(10) Patent No.: US 12,262,259 B2
(45) Date of Patent: Mar. 25, 2025

(54) DETERMINING MEASUREMENT TIME, CAMPED CELL OR OTHER PARAMETERS, AND CONFIGURING A NEIGHBORING CELL LIST

(71) Applicant: ZTE Corporation, Guangdong (CN)

(72) Inventor: Jie Tan, Guangdong (CN)

(73) Assignee: ZTE Corporation, Shenzhen (CN)

( * ) Notice: Subject to any disclaimer, the term of this patent is extended or adjusted under 35 U.S.C. 154(b) by 285 days.

(21) Appl. No.: 17/707,014

(22) Filed: Mar. 29, 2022

(65) Prior Publication Data
US 2022/0225182 A1 Jul. 14, 2022

Related U.S. Application Data

(63) Continuation of application No. PCT/CN2020/108095, filed on Aug. 10, 2020.

(30) Foreign Application Priority Data

Sep. 30, 2019 (CN) .......................... 201910945695.3

(51) Int. Cl.
*H04W 36/00* (2009.01)
*H04W 24/02* (2009.01)

(52) U.S. Cl.
CPC ... *H04W 36/0058* (2018.08); *H04W 36/0061* (2013.01); *H04W 24/02* (2013.01)

(58) Field of Classification Search
None
See application file for complete search history.

(56) References Cited

U.S. PATENT DOCUMENTS

| 2018/0192436 A1 | 7/2018 | Yi et al. |
| 2019/0028999 A1 | 1/2019 | Yerramalli et al. |
| 2019/0150116 A1* | 5/2019 | Johansson ............. H04W 68/04 455/458 |

FOREIGN PATENT DOCUMENTS

| CN | 102572916 A | 7/2012 |
| CN | 102647747 A | 8/2012 |
| CN | 102769876 A | 11/2012 |
| CN | 106961729 A | 7/2017 |
| CN | 111107594 A | 5/2020 |

(Continued)

OTHER PUBLICATIONS

Extended European Search Report for EP Application No. 20872644.8 mailed Oct. 11, 2023 (11 pages).

(Continued)

*Primary Examiner* — Suhail Khan
(74) *Attorney, Agent, or Firm* — Crowell & Moring LLP

(57) ABSTRACT

Provided are a method and an apparatus for determining a measurement time, determining a camped cell, for configuring a neighboring cell list, and for determining other parameters. Determining measurement time may include receiving configuration information of an automatic neighbor relation (ANR) that includes a measurement configuration parameter, an ANR measurement duration or an ANR measurement timer. ANR measurement is performed based on the configuration information. When a first condition is satisfied, the ANR measurement is finished. The first condition includes an ANR measurement duration, an ANR measurement timer, or an ANR measurement result acquisition.

3 Claims, 5 Drawing Sheets

Determining a target paging period in a radio resource control-inactive (RRC-Inactive) based on an idle paging time window (PTW), where the idle PTW window determines a location of a window by using an eDRX parameter in an idle mode ⸺ S710

(56) References Cited

FOREIGN PATENT DOCUMENTS

| RU | 2 671 995 C1 | 11/2018 |
| WO | WO 2012/024956 A1 | 3/2012 |
| WO | WO 2018/063467 A1 | 4/2018 |

OTHER PUBLICATIONS

Qualcomm Inc., "PTW for eDRX in RRC-Inactive" *3GPP TSG-SA WG2 Meeting #130, S2-1900175*, Jan. 25, 2019 (5 pp.).

Anonymous: "3 Generation Partnership Project; Technical Specification Group Radio Access Network; Evolved Universal Terrestrial Radio Access (E-UTRA); User Equipment (UE) procedures in idle mode (Release 15)", 3GPP Standard; Technical Specification; 3GPP TS 36.304, 3rd Generation Partnership Project (3GPP), Mobile Competence Centre; 650, Route Des Lucioles; F-06921 Sophia-Antipolis Cedex; France, No. V15.1.0, Sep. 27, 2018 pp. 1-55, XP051487410 (55 pp.).

International Search Report and Written Opinion received for Application No. PCT/CN2020/108095 mailed Nov. 12, 2020 (15 pages).

Nokia et al. "Support of Extended DRX for NBIOT and MTC" *3GPP TSG-RAN WG3#103, RJ-190228*, Mar. 1, 2019 (Mar. 1, 2019).

Qualcomm Inc. "PTW for eDRX in RRC-Inactive" *3GPP TSG-SA W62 Meeting #130, S2-1900175*, Jan. 25, 2019 (Jan. 25, 2019).

Office Action for Russian Patent Application No. 2022111428 dated Dec. 13, 2023, with English translation (9 pages).

Search Report issued for Russian Patent Application No. 2022111428 dated Dec. 12, 2023, with English translation (4 pp.).

Office Action for China Patent Application No. 2023102601609 dated Sep. 29, 2023, with translation (20 pages).

Qualcomm Incorporated, "Access Tratum Changes to Support eDRX for eMTC Connected 5GC in RRC_INACTIVE State," 3GPP TSG-RAN WG2 Meeting #107R2-1910468, Aug. 30, 2019 (3 pp.).

Qualcomm Inc., "PTW for eDRX in RRC-Inactive" *3GPP TSG-SA W62 Meeting #130, S2-1900175*, Jan. 25, 2019 (5 pp.).

Official Action for Russian Patent Application No. 2022111428 dated May 13, 2024, with English translation (7 pages).

Communication from the European Patent Office for EP Application No. 20 872 644.8 dated Nov. 26, 2024 (11 pages).

Communication from the European Patent Office for EP Application No. 20 872 644.8 dated Aug. 27, 2024 (7 pages). ,,, \* cited by examiner

DETERMINING MEASUREMENT TIME, CAMPED CELL OR OTHER PARAMETERS, AND CONFIGURING A NEIGHBORING CELL LIST

PRIORITY

This application claims priority as a Continuation of PCT/CN2020/108095, filed on Aug. 10, 2020, entitled "METHOD AND APPARATUS FOR DETERMINING MEASUREMENT TIME, METHOD AND APPARATUS FOR DETERMINING CAMPED CELL, METHOD AND APPARATUS FOR CONFIGURING NEIGHBOURING CELL LIST, METHOD AND APPARATUS FOR DETERMINING PARAMETERS, DEVICE, AND STORAGE MEDIUM", published as WO 2021/063108 A1, which claims priority to Chinese Patent Application No. 201910945695.3 filed with the China National Intellectual Property Administration (CNIPA) on Sep. 30, 2019, the entireties of the above applications are each incorporated herein by reference.

TECHNICAL FIELD

The present application relates to wireless communication networks, for example, a method and an apparatus for determining measurement time, a camped cell, configuring a neighboring cell list, and for determining parameters, including a device, and a storage medium.

BACKGROUND

In Narrowband Internet of Things (NB-IoT), only a user equipment (UE) that is in an idle state executes Automatic Neighbor Relation (ANR) detection. However, due to different measurement capabilities of UEs, it takes different times to obtain measurement results under the same conditions, and when a UE executes ANR measurement, not all carriers can obtain measurement results. Therefore, when the ANR measurement result fails to be obtained in time, the UE will execute ANR measurement for a long time, which consumes a large amount of electric energy.

SUMMARY

The present application provides a method and an apparatus for determining measurement time, a method and an apparatus for determining a camped cell, a method and an apparatus for configuring a neighboring cell list, a method and an apparatus for determining parameters, a device, and a storage medium, so as to avoid repeated ANR measurement and save electric energy.

The embodiments of the present disclosure provide a method for determining measurement time, which includes the following.

Configuration information of an ANR is received, where the configuration information includes an ANR measurement duration or an ANR measurement timer.

ANR measurement is performed based on the configuration information.

When a first condition is satisfied, the ANR measurement is finished, where the first condition includes at least one of the following: the ANR measurement duration is reached, the ANR measurement timer expires, or an ANR measurement result is acquired.

The embodiments of the present disclosure further provide a method for determining a camped cell, which includes the following.

At least one neighboring cell list sent by a base station is received.

A target neighboring cell list is determined from the at least one neighboring cell list based on terminal feature information, where the terminal feature information includes at least one of the following: whether a terminal supports a time-sensitive communication (TSC) traffic, or clock information required by a terminal to carry the TSC traffic.

The embodiments of the present disclosure further provide a method for configuring a neighboring cell list, which includes the following.

Neighboring cell lists are configured, where the neighboring cell lists are determined through cell feature information, and the cell feature information includes at least one of the following: whether a cell supports a TSC traffic, or whether a cell provides clock reference information.

At least one neighboring cell list is sent to a UE through a system information block (SIB).

The embodiments of the present disclosure further provide a method for determining a parameter, which includes the following.

A retransmission timer sent by a core network is received, where the retransmission timer includes a network access service (NAS) retransmission timer or a short message service (SMS) retransmission timer.

A short extended discontinuous reception (eDRX) parameter of a radio resource control-inactive (RRC-Inactive) state is determined according to the retransmission timer.

The embodiments of the present disclosure further provide a method for determining a parameter, which includes the following.

A target paging period in an RRC-Inactive state is determined based on an idle paging time window (PTW), where the idle PTW window determines a location of a window by using an eDRX parameter in an idle mode.

The embodiments of the present disclosure provide an apparatus for determining measurement time, which includes a configuration information receiving module, a measurement module, and a measurement finishing module.

The configuration information receiving module is configured to receive configuration information of an ANR, where the configuration information includes an ANR measurement duration or an ANR measurement timer.

The measurement module is configured to perform ANR measurement based on the configuration information.

The measurement finishing module is configured to, when a first condition is satisfied, finish the ANR measurement, where the first condition includes at least one of the following: the ANR measurement duration is reached, the ANR measurement timer expires, or an ANR measurement result is acquired.

The embodiments of the present disclosure further provide an apparatus for determining a camped cell, which includes a neighboring cell list receiving module and a target neighboring cell list determination module.

The neighboring cell list receiving module is configured to receive at least one neighboring cell list sent by a base station.

The target neighboring cell list determination module is configured to determine a target neighboring cell list from the at least one neighboring cell list based on terminal feature information, where the terminal feature information includes at least one of the following: whether a terminal supports a TSC traffic, or clock information required by a terminal to carry the TSC traffic.

The embodiments of the present disclosure further provide an apparatus for configuring a neighboring cell list, which includes a neighboring cell list configuration module and a neighboring cell list sending module.

The neighboring cell list configuration module is configured to configure neighboring cell lists, where the neighboring cell lists are determined through cell feature information, and the cell feature information includes at least one of the following: whether a cell supports a TSC traffic, or whether a cell provides clock reference information.

The neighboring cell list sending module is configured to send at least one neighboring cell list to a UE through a SIB.

The embodiments of the present disclosure further provide an apparatus for determining a parameter, which includes a retransmission timer receiving module and a parameter determination module.

The retransmission timer receiving module is configured to receive a retransmission timer sent by a core network, where the retransmission timer includes a NAS retransmission timer or an SMS retransmission timer.

The parameter determination module is configured to determine a short eDRX parameter of an RRC-Inactive state according to the retransmission timer.

The embodiments of the present disclosure further provide an apparatus for determining a parameter, which includes a paging period determination module.

The paging period determination module is configured to determine a target paging period in an RRC-Inactive state based on an idle PTW, where the idle PTW window determines a location of a window by using an eDRX parameter in an idle mode.

The embodiments of the present disclosure provide a device. The device includes one or more processors and a memory which is configured to store one or more programs.

The one or more programs, when executed by the one or more processors, enable the one or more processors to perform any one of the methods described in the embodiments of the present disclosure.

The embodiments of the present disclosure provide a storage medium. The storage medium stores a computer program which, when executed by a processor, performs any one of the methods described in the embodiments of the present disclosure.

DETAILED DESCRIPTION

Embodiments of the present application are described below in conjunction with the drawings.

The steps of methods illustrated in the flowcharts among the drawings may be performed by, for example, a computer system capable of executing a set of computer-executable instructions. Moreover, although logical sequences are illustrated in the flowcharts, in some cases, the illustrated or described methods may be performed in sequences different from the sequences described herein.

The technical solutions of the present application can be applied to various communication systems such as Global System for Mobile Communications (GSM), Code-Division Multiple Access (CDMA) system, Wideband Code-Division Multiple Access (WCDMA) system, General Packet Radio Service (GPRS), Long Term Evolution (LTE) system, Advanced Long Term Evolution (LTE-A) system, Universal Mobile Telecommunications System (UMTS), 5th Generation mobile networks (5G) system and the like, which is not limited to the embodiments of the present application.

Figure 1:
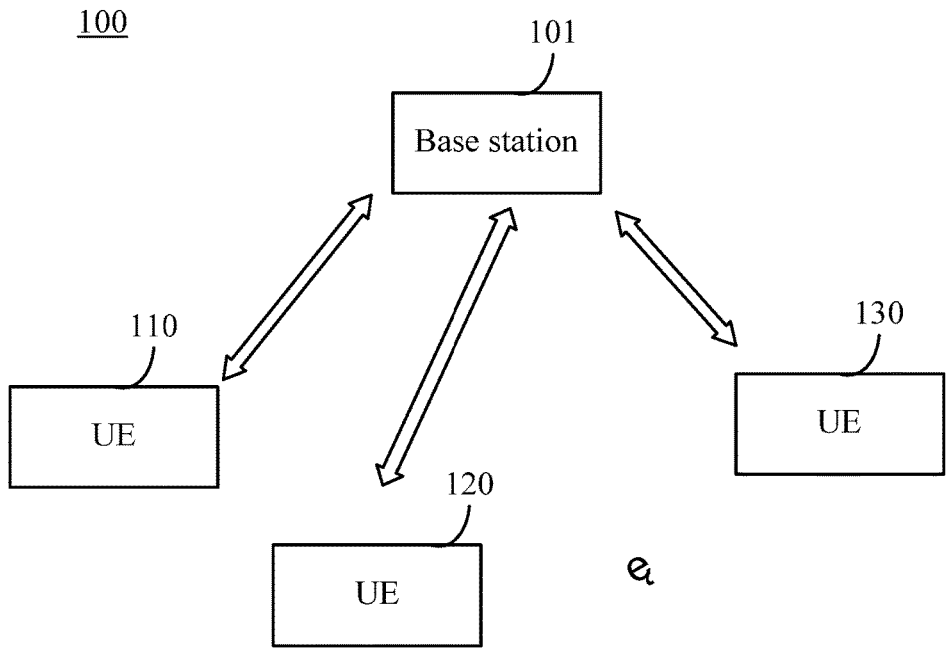
FIG. 1 is a structural diagram of a wireless network system provided by the present application.

The embodiments of the present application can be applied to wireless networks of different formats. The wireless access network may include different communication nodes in different systems. FIG. 1 is a structural diagram of a wireless network system provided by the present application. As shown in FIG. 1, the wireless network system 100 includes a base station 101, a UE 110, a UE 120, and a UE 130. The base station 101 performs wireless communication with the UE 110, the UE 120, and the UE 130, respectively.

In an embodiment of the present application, the base station may be a device capable of communicating with a UE. The base station may be any device having a wireless transceiver function, including, but not limited to, a base station (NodeB, NB), an evolved NodeB (eNB), a base station in a 5G communication system, a base station in a future communication system, an access node in a WiFi system, a wireless relay node, a wireless backhaul node, and the like. The base station may also be a wireless controller in a Cloud Radio Access Network (CRAN) scenario, and may also be a small station, a transmit-receive point (TRP) and the like, which is not limited to the embodiments of the present application.

The UE is a device having a wireless transceiver function, may be deployed on land, and the UE may include an indoor or outdoor device, a hand-held device, a wearable device, and a vehicle-mounted device. Alternatively, the UE may also be deployed above the water (for example, on a ship and the like), and may also be deployed in the air (for example, on an airplane, a balloon, a satellite and the like). The UE may be a mobile phone, a Pad, a computer having a wireless transceiver function, a virtual reality (VR) terminal, an augmented reality (AR) terminal, a wireless terminal for industrial control, a wireless terminal for self driving, a wireless terminal for remote medical, a wireless terminal for smart grid, a wireless terminal for transportation safety, a wireless terminal for smart city, a wireless terminal for smart home, and the like. Application scenarios are not limited to the embodiments of the present application. The UE may also sometimes be referred to as a terminal, an access terminal, a UE unit, a UE station, a mobile station, a mobile, a remote station, a remote terminal, a mobile device, a UE terminal, a wireless communication device, a UE agent, a UE device, and the like, which is not limited to the embodiments of the present application.

Figure 2:
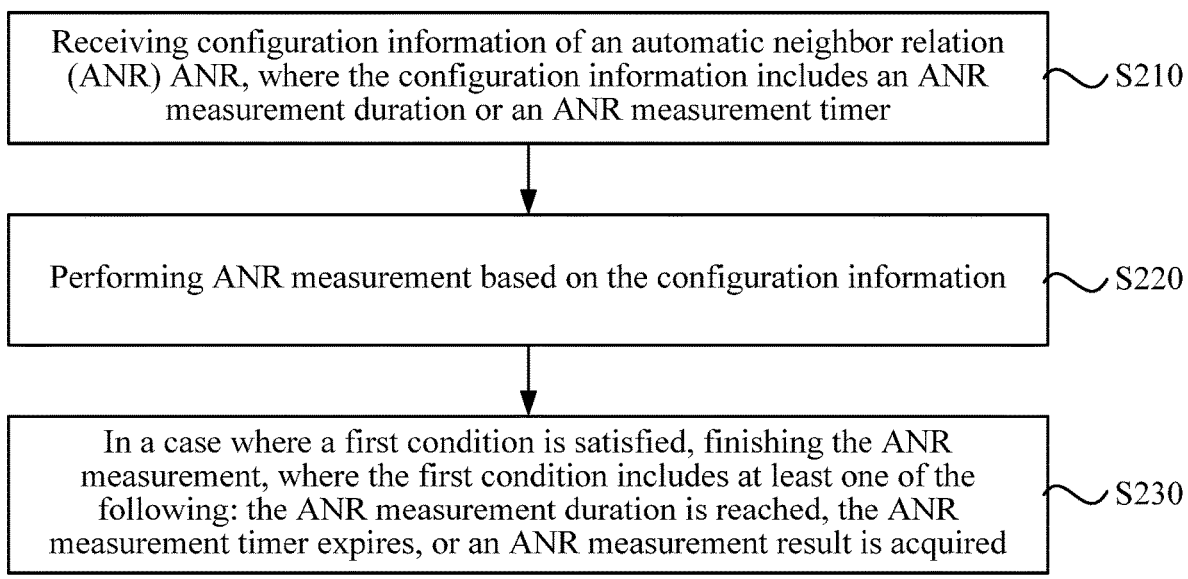
FIG. 2 is a flowchart of a method for determining measurement time provided by the present application.

In an exemplary embodiment, FIG. 2 is a flowchart of a method for determining measurement time provided by the present application. The method may be applied to the case of performing ANR measurement. The method may be performed by an apparatus for determining measurement time provided by the present application, and the apparatus for determining measurement time may be implemented by software and/or hardware and integrated into a UE.

As shown in FIG. 2, the method for determining measurement time provided by the present application includes S210, S220, and S230.

The Automatic Neighbor Relationship (ANR) is an important function of self-organizing network (SON). The ANR implements the integrity and validity of the neighbor relationship through automatic maintenance, so as to reduce the abnormal neighbor handover. The purpose of ANR is to reduce the complexity of a communication network, save the cost of network maintenance, timely and accurately reflect the network neighbor relationship, and improve the network performance. The ANR is established on the basis that a base station interacts with an Operation & Management (O&M) device through a UE, so as to automatically identify and establish a neighbor relationship and perform continuous optimization maintenance such as neighboring cell detection, neighbor relationship addition and deletion, neighbor relationship attribute modification, and the like.

In NB-IoT, only a UE that is in an idle state may execute ANR measurement. However, due to different measurement capabilities of UEs, it takes different times to obtain measurement results under the same conditions; and when the UE performs ANR measurement, not all carriers can satisfy ANR reporting requirements. For example, when no cell satisfies the ANR reporting requirements among all measurements, the corresponding measurements fail to be obtained. Moreover, when ANR measurement is performed in the NB-IoT, neighbor measurement relaxation, SIntraSearchP/SIntraSearchQ, and SnonIntraSearchP/SnonIntraSearchQ decision are unable to be performed. When the reference signal receiving power (RSRP) of a serving cell is less than SSearchDeltaP, the neighbor measurement is unable to be performed. When the wireless quality of the serving cell is higher than a certain threshold (SIntraSearchP/SIntraSearchQ), the intra-frequency neighbor measurement is unable to be performed; when the wireless quality of the serving cell is higher than a certain threshold (SnonIntraSearchP/SnonIntraSearchQ), inter-frequency neighbor measurement and inter-system neighbor measurement are unable to be performed. It means that the UE consumes more electric energy when the UE performs ANR measurement than when the UE is in a normal idle mode. When the UE performs ANR measurement but fails to obtain ANR measurement results, that is, when the UE camps on an island cell or the RSRP of a neighboring cell of a cell where the UE camps is very low, the UE will perform ANR measurement for a long time and consume a large amount of electric energy.

In S210, configuration information of an ANR is received, where the configuration information includes an ANR measurement duration or an ANR measurement timer.

When a UE enters the idle mode, the UE immediately performs ANR measurement requested by a base station once and performs measurement for a frequency list and a cell list included in ANR measurement configuration information.

In practical applications, UEs having different measurement capabilities may consume different times to obtain service cells that satisfy the conditions. In another example, when the UE performs ANR measurement and fails to obtain a set of ANR measurement results, the UE will repeatedly perform ANR measurement for a long time, which is contrary to the purpose of energy saving in NB-IoT.

Therefore, in addition to the original measurement configuration parameter, an eNB further includes an ANR measurement time parameter in the configuration information of the ANR, and the ANR measurement time parameter may be an ANR measurement duration or an ANR measurement timer.

The ANR measurement duration or the ANR measurement timer includes at least one of: a duration in seconds and/or milliseconds, a duration in units of discontinuous reception (DRX) periods, or a duration in units of a product of a DRX period and the number of to-be-measured carriers.

The values of ANR measurement time parameters configured for UEs having different measurement capabilities may be different, so as to achieve the purpose of energy saving in NB-IoT.

The configuration information of the ANR is configured by the base station eNB and sent to the UE. The UE receives the configuration information of the ANR sent by the base station.

In S220, ANR measurement is performed based on the configuration information.

In NB-IoT, when a UE enters the idle mode, the UE immediately performs the requested ANR measurement once and performs measurement for a frequency list and a cell list included in the configuration information of the ANR.

In S230, when a first condition is satisfied, the ANR measurement is finished, where the first condition includes at least one of the following: the ANR measurement duration is reached, the ANR measurement timer expires, or an ANR measurement result is acquired.

After all measurements for the frequency list and the cell list are finished, there may be no serving cell that satisfies the condition. For example, when the UE camps in an isolated cell or the RSRP of a neighboring cell is very low, the UE will repeatedly perform ANR measurement for a long time, which is contrary to the purpose of energy saving in NB-IoT.

The problem that the ANR measurement is performed for a too long time in the above-described case is limited by the ANR measurement duration or the ANR measurement timer in the configuration information of ANR measurement.

The ANR measurement duration or the ANR measurement timer is set according to the difference of measurement capabilities of UEs and the difference of frequency list and cell list in the ANR measurement configuration, and may be a time parameter of one second and/or one millisecond or a time parameter in units of DRX periods or in units of the product of a DRX period and the number of to-be-measured carriers, so as to effectively avoid unnecessary waste in the measurement process.

In the technical solution provided in this embodiment of the present application, the situation that the UE performs ANR measurement for a long time and consumes a large amount of electric energy when the ANR measurement fails to be obtained in some cases is avoided, and with the introduction of the concept of the time parameter for performing ANR measurement, the longest ANR measurement time that the UE can support is specified, thereby reducing the energy consumption of the UE in NB-IoT.

In an exemplary embodiment, in NB-IoT, when the UE enters an idle mode, the UE performs measurement for the frequency list and the cell list included in the ANR configuration information.

After all measurements for the frequency list and the cell list are finished, a set of ANR measurement results are acquired, then the ANR measurement is finished to obtain one measurement result, and the measurement result is sent to the base station in the next RRC process. The situation that ANR measurement is repeatedly performed after a set of ANR measurement results are acquired is avoided, thereby achieving the purpose of energy saving in NB-IoT.

Figure 3:
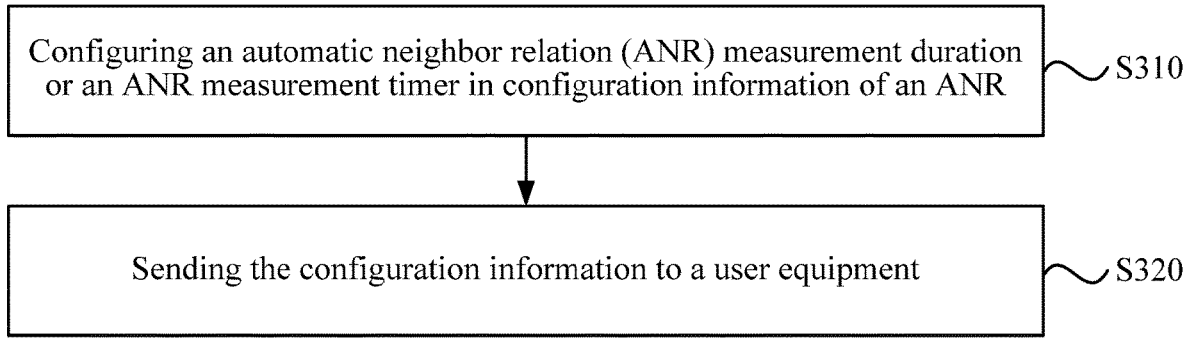
FIG. 3 is a flowchart of another method for determining measurement time provided by the present application.

In an exemplary embodiment, FIG. 3 is a flowchart of another method for determining measurement time provided by the present application. The method may be applied to the case of performing ANR measurement. The method may be performed by an apparatus for determining measurement time provided by the present application, and the apparatus for determining measurement time may be implemented by software and/or hardware and integrated into a base station.

As shown in FIG. 3, the method for determining measurement time provided by the present application includes S310 and S320.

In S310, an ANR measurement duration or an ANR measurement timer is configured in configuration information of an ANR.

In practical applications, UEs having different measurement capabilities may consume different times to obtain service cells that satisfy the conditions.

In addition to the original measurement configuration parameter, an eNB further includes one ANR measurement time parameter in the configuration information of the ANR, and the ANR measurement time parameter may be an ANR measurement duration or an ANR measurement timer.

The measurement duration or the ANR measurement timer includes at least one of: a duration in seconds and/or milliseconds, a duration in units of DRX periods, or a duration in units of the product of a DRX period and the number of to-be-measured carriers.

The values of ANR measurement time parameters configured for UEs having different measurement capabilities may be different, so as to achieve the purpose of energy saving in NB-IoT.

In S320, the configuration information is sent to a UE.

In an exemplary embodiment, the configuration information is configured through a SIB and/or a radio resource control (RRC) connection release message.

In the technical solution provided in this embodiment of the present application, the situation that the UE performs ANR measurement for a long time and consumes a large amount of electric energy when the ANR measurement fails to be obtained in some cases is avoided, and with the introduction of the concept of the time parameter for performing ANR measurement, the longest ANR measurement time that the UE can support is specified, thereby reducing the energy consumption of the UE in NB-IoT.

Figure 4:
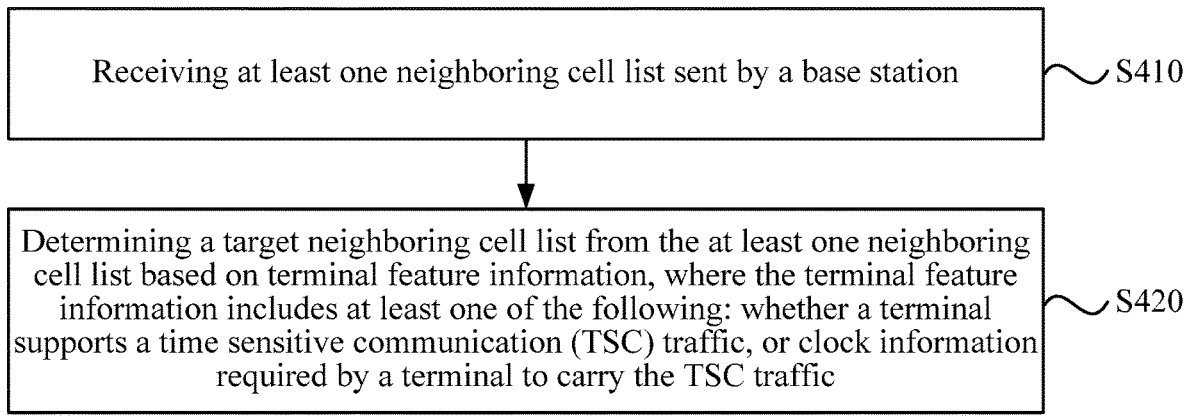
FIG. 4 is a flowchart of a method for determining a camped cell provided by the present application.

In an exemplary embodiment, FIG. 4 is a flowchart of a method for determining a camped cell provided by the present application. The method may be applied to the case of determination of the camping of a TSC UE. The method may be performed by an apparatus for determining a camped cell provided by the present application, and the apparatus for determining a camped cell may be implemented by software and/or hardware and integrated into a UE.

In order to support the TSC traffic, a gNB should send accurate reference time to a UE, and the time granularity should satisfy the TSC delay accuracy requirements. However, because additional radio resources are required to provide accurate clock reference time, not all cells support such accurate clock reference time transfer. In addition, some gNBs that do not support accurate clock reference information transfer cannot provide accurate clock reference time transfer. Therefore, only some gNB/cells support the TSC traffic. If the UE carrying the TSC traffic camps in a cell without accurate reference time transfer, the TSC traffic cannot be performed normally, which affects the availability of the TSC traffic.

As shown in FIG. 4, the method for determining a camped cell provided by the present application includes S410 and S420.

In S410, at least one neighboring cell list sent by a base station is received.

In S420, a target neighboring cell list is determined from the at least one neighboring cell list based on terminal feature information, where the terminal feature information includes at least one of the following: whether a terminal supports a TSC traffic, or clock information required by a terminal to carry the TSC traffic.

The terminal TSC service includes that the terminal is a TSC terminal or that the traffic carried by the terminal is a TSC traffic.

The UE selects a corresponding neighboring cell list based on the terminal feature information in the cell selection and reselection process, so as to determine the range of candidate target cells.

The terminal feature information includes at least one of the following: whether a terminal supports a TSC traffic, or clock information required by a terminal to carry the TSC traffic. The UE needs accurate clock information to work.

In an exemplary embodiment, the corresponding target neighboring cell list is determined based on the terminal feature information in one of the following manners.

When the terminal supports the TSC traffic, a neighboring cell list including a cell supporting the TSC traffic is determined as the target neighboring cell list; or a neighbor list including a cell providing clock reference information is determined as the target neighboring cell list.

The target neighboring cell list includes an intra-frequency cell list and/or an inter-frequency cell list.

In order to support the TSC traffic, in the case where not all cells can support accurate clock reference time transfer and some legacy gNBs cannot support more accurate clock reference time delivery, an intra-frequency neighboring cell list and an inter-frequency neighboring cell list that provide accurate clock reference time in SIB9 may be indicated through SIB3 and SIB4, respectively.

The intra-frequency neighboring cell list and the inter-frequency neighboring cell list are indicated according to SIB3 and SIB4, and the UE performs selection or reselection only in a neighboring cell list including the accurate clock reference time, rather than in cells that do not include the accurate reference time or that are not in the neighboring cell list.

Figure 5:
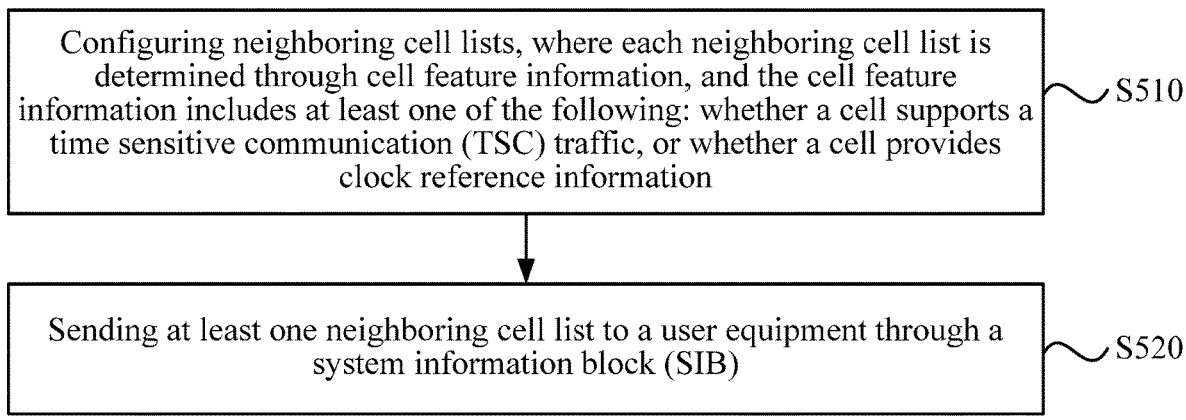
FIG. 5 is a flowchart of a method for configuring a neighboring cell list provided by the present application.

In an exemplary embodiment, FIG. 5 is a flowchart of a method for configuring a neighboring cell list provided by the present application. The method may be applied to the case of determination of the camping of a TSC UE. The method may be performed by an apparatus for determining a camped cell provided by the present application, and the apparatus for determining a camped cell may be implemented by software and/or hardware and integrated into a base station.

As shown in FIG. 5, the method for configuring a neighbor cell list provided by the present application includes S510 and S520.

In S510, neighboring cell lists are configured, where neighboring cell lists are determined through cell feature information, and the cell feature information includes at least one of the following: whether a cell supports a TSC traffic, or whether a cell provides clock reference information.

In S520, at least one neighboring cell list is sent to a UE through a SIB.

Neighboring cell lists are configured based on cell feature information, where the cell feature information includes at least one of the following: whether a cell supports a TSC traffic, or whether a cell provides clock reference information.

The base station configures neighboring cell lists based on cell feature information, where the cell feature information includes at least one of the following: whether a cell supports a TSC traffic, or whether a cell provides clock reference information, and the neighboring cell lists include an intra-frequency/inter-frequency cell list.

Neighboring cell lists are configured based on the cell feature information in the following manner: neighboring cell lists are configured based on the TSC traffic. All the cells included in the neighboring cell lists configured based on the TSC traffic support the TSC traffic. All the cells included in the neighboring cell lists configured based on the provision of clock reference information provide the clock reference information.

For example, the base station configures a neighboring cell list corresponding to the TSC traffic. That is, all neighboring cells in the neighboring cell list corresponding to the TSC traffic support the TSC traffic.

The configured information may be configured through SIB3 with respect to the intra-frequency neighboring cell.

The configured information may be configured through SIB4 with respect to the inter-frequency neighboring cell.

In the information configured by a gNB, the intra-frequency neighboring cell list that provides accurate reference time in SIB9 may be indicated through SIB3, and the inter-frequency neighboring cell list that provides accurate reference time in SIB9 may be indicated through SIB4.

In the technical solution of this embodiment, the problem that the TSC traffic cannot be performed normally because the UE carrying the TSC traffic camps in a cell without accurate reference time transfer is solved.

Figure 6:
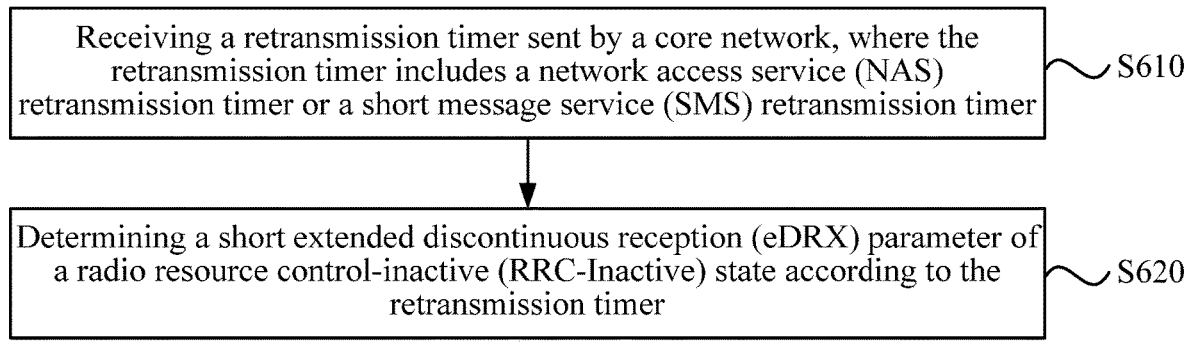
FIG. 6 is a flowchart of a method for determining a parameter provided by the present application.

In an exemplary embodiment, FIG. 6 is a flowchart of a method for determining a parameter provided by the present application. The method may be applied to the case of determination of a short eDRX parameter of the RRC-Inactive state. The method may be performed by an apparatus for determining a parameter provided by the present application, and the apparatus for determining a parameter may be implemented by software and/or hardware and integrated into a base station.

As shown in FIG. 6, the method for determining a parameter provided by the present application includes S610 and S620.

In S610, a retransmission timer sent by a core network is received, where the retransmission timer includes a NAS retransmission timer or an SMS retransmission timer.

In S610, a short eDRX parameter of an RRC-Inactive state is determined according to the retransmission timer.

The short eDRX parameter is determined according to the retransmission timer in the following manner: a period length of the short eDRX parameter is determined according to the retransmission timer, where the period length of the short eDRX parameter is less than or equal to a length of the retransmission timer.

Information of the NAS retransmission timer and information of the SMS retransmission timer are sent through the core network in at least one of the following manners.

When an initial context setup request is sent, the information of the NAS retransmission timer or the information of the SMS retransmission timer is sent through the core network; when a UE context restore response is sent, the information of the NAS retransmission timer or the information of the SMS retransmission timer is sent through the core network; when a handover request is sent, the information of the NAS retransmission timer or the information of the SMS retransmission timer is sent through the core network; or when a path handover request acknowledgement message is sent, the information of the NAS retransmission timer or the information of the SMS retransmission timer is sent through the core network.

The next generation-eNB (ng-eNB) needs to configure parameters about the short eDRX for the UE in the RRC-Inactive state, and the sleep period in the short eDRX is determined by the NAS retransmission timer or the SMS retransmission timer. However, the ng-eNB cannot directly obtain the NAS retransmission timer or the SMS retransmission timer, which cannot guarantee that the period length of the short eDRX is less than or equal to the length of the NAS retransmission timer or the length of the SMS retransmission timer. Therefore, the core network needs to provide the length of the NAS retransmission timer and the length of the SMS retransmission timer to the ng-eNB.

Therefore, when a UE-dedicated link is established at an Si interface, the core network provides the base station with the NAS retransmission timer and the SMS retransmission timer for the base station to determine the short eDRX parameter of the RRC-Inactive state, and the NAS retransmission timer and the SMS retransmission timer may be provided in the following messages: an initial context setup request, a UE context restore response, a handover request, and a path handover request.

Figure 7:
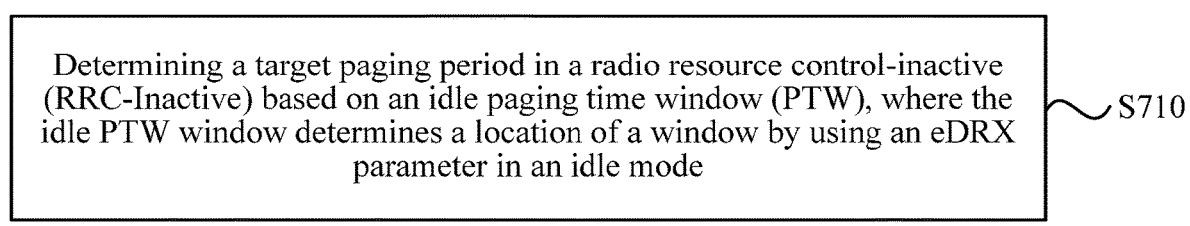
FIG. 7 is a flowchart of another method for determining measurement time provided by the present application.

In an exemplary embodiment, FIG. 7 is a flowchart of another method for determining measurement time provided by the present application. The method may be applied to the case of determination of a paging period. The method may be performed by an apparatus for determining a parameter provided by the present application, and the apparatus for determining a parameter may be implemented by software and/or hardware and integrated into a base station.

As shown in FIG. 7, the method for determining a parameter provided by the present application includes S710.

In S710, a target paging period in an RRC-Inactive state is determined based on an idle PTW, where the idle PTW window determines a location of a window by using an eDRX parameter in an idle mode.

In an exemplary embodiment, the target paging period in the RRC-Inactive state is determined based on the idle PTW in at least one of the following manners.

Within the idle PTW, the shortest period among a radio access network (RAN) paging period configured in the RRC-Inactive state, a UE-specific paging period and a cell-default paging period is determined as the target paging period.

Outside the idle PTW, the RAN paging period configured in the RRC-Inactive state is determined as the target paging period.

Within the idle PTW, the shortest period between the RAN paging period configured in the RRC-Inactive state and the UE-specific paging period is determined as the target paging period.

The RAN paging period configured in the RRC-Inactive state is configured by a base station for a UE through UE-dedicated signaling as an RRC-Inactive configuration parameter, the cell-default paging period is a paging period parameter broadcast by the base station to the UE, and the UE-specific paging period is a UE-specific idle DRX period sent by a core network to the UE after negotiation between the UE and the core network through a NAS.

The UE in the RRC-Inactive state shall monitor a paging channel where the core network initiates paging and a paging channel where the RAN initiates paging. For the monitoring of the paging initiated by the core network, the eDRX in the idle mode needs to be considered. For example, the UE may monitor a paging occasion only during the periodic PTW configured for the UE, or the UE may monitor a paging occasion until the UE receives a paging message including a NAS identifier of the UE during the PTW, and the earlier one of the above-described two cases is adopted. Therefore, a certain degree of coordination between the short eDRX of the RRC-Inactive state and the eDRX in the idle mode is required to simplify the complexity of the UE.

Therefore, within the idle PTW, in order to monitor the paging initiated by the core network, the paging period T is determined by the shortest period among the RAN paging period configured in the RRC-Inactive state, the UE-specific paging period (optional) and the cell-default paging period (optional). Outside the idle mode PTW, in order to save electric energy consumed by the UE, the paging period T is determined by the RAN paging period T. Therefore, in order to support the eDRX of the RRC-INACTIVE state and the eDRX in the idle mode, the ng-eNB needs to obtain the eDRX parameter in the idle mode, so as to determine the paging period T in the RRC-Inactive state.

Figure 8:
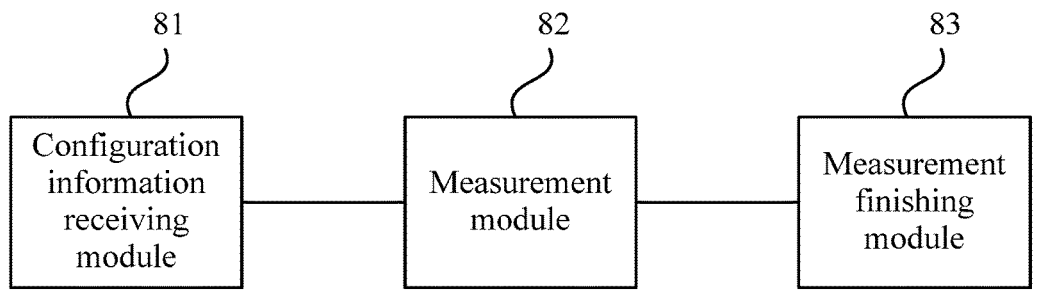
FIG. 8 is a structural diagram of an apparatus for determining measurement time provided by the present application.

In an exemplary embodiment, FIG. 8 is a structural diagram of an apparatus for determining measurement time provided by the present application. The apparatus may be applied to the case of performing ANR measurement. The apparatus for determining measurement time may be implemented by software and/or hardware and may be integrated into a UE.

As shown in FIG. 8, the apparatus for determining measurement time provided by the present application includes a configuration information receiving module 81, a measurement module 82, and a measurement finishing module 83.

The configuration information receiving module 81 is configured to receive configuration information of an ANR, where the configuration information includes an ANR measurement duration or an ANR measurement timer. The measurement module 82 is configured to perform ANR measurement based on the configuration information. The measurement finishing module 83 is configured to, when a first condition is satisfied, finish the ANR measurement, where the first condition includes at least one of the following: the ANR measurement duration is reached, the ANR measurement timer expires, or an ANR measurement result is acquired.

The apparatus for determining measurement time provided by this embodiment is used for implementing the method for determining measurement time provided by the embodiments of the present application. The implementation principles and technical effects of the apparatus for determining measurement time provided by this embodiment are similar to those of the method for determining measurement time provided by the embodiments of the present application, which will not be repeated herein.

In an exemplary embodiment, the measurement duration or the ANR measurement timer includes at least one of: a duration in seconds, a duration in milliseconds, a duration in units of DRX periods, or a duration in units of the product of a DRX period and the number of to-be-measured carriers.

Figure 9:
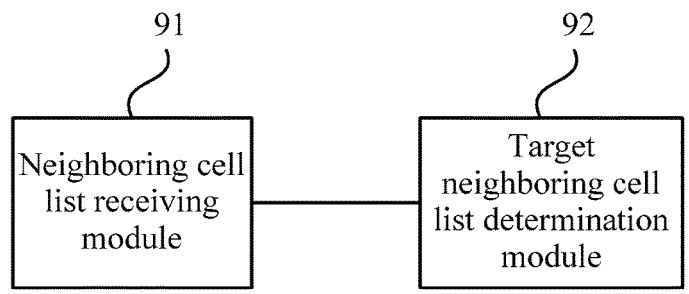
FIG. 9 is a structural diagram of an apparatus for determining a camped cell provided by the present application.

In an exemplary embodiment, FIG. 9 is a structural diagram of an apparatus for determining a camped cell provided by the present application. The apparatus may be applied to the case of determination of the camping of a TSC UE. The apparatus for determining a camped cell may be implemented by software and/or hardware and may be integrated into a UE.

As shown in FIG. 9, the apparatus for determining a camped cell provided by the present application includes a neighboring cell list receiving module 91 and a target neighboring cell list determination module 92.

The neighboring cell list receiving module 91 is configured to receive at least one neighboring cell list sent by a base station. The target neighboring cell list determination module 92 is configured to determine a target neighboring cell list from the at least one neighboring cell list based on terminal feature information, where the terminal feature information includes at least one of the following: whether a terminal supports a TSC traffic, or clock information required by a terminal to carry the TSC traffic.

The apparatus for determining a camped cell provided by this embodiment is used for implementing the method for determining a camped cell provided by the embodiments of the present application. The implementation principles and technical effects of the apparatus for determining a camped cell provided by this embodiment are similar to those of the method for determining a camped cell provided by the embodiments of the present application, which will not be repeated herein.

In an optional embodiment, the target neighboring cell list determination module 92 is configured to execute at least one of the following operations.

When the terminal supports the TSC traffic, a neighboring cell list including a cell supporting the TSC traffic is determined as the target neighboring cell list; or a neighbor list including a cell providing clock reference information is determined as the target neighboring cell list.

Figure 10:
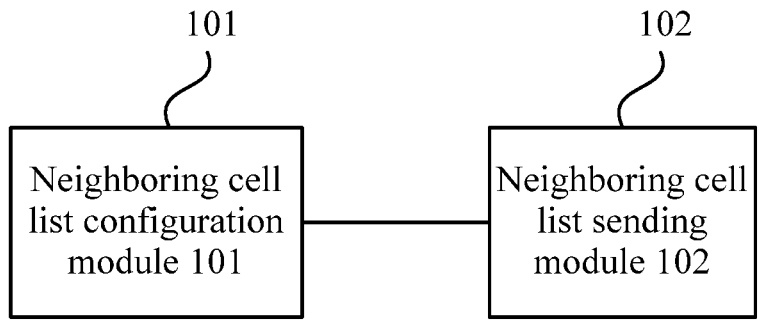
FIG. 10 is a structural diagram of an apparatus for configuring a neighboring cell list provided by the present application.

In an exemplary embodiment, FIG. 10 is a structural diagram of an apparatus for configuring a neighboring cell list provided by the present application. The apparatus may be applied to the case of determination of the camping of a TSC UE. The apparatus for configuring a neighboring cell list or determining a camped cell may be implemented by software and/or hardware and may be integrated into a base station.

As shown in FIG. 10, the apparatus for configuring a neighboring cell list or determining a camped cell provided by the present application includes a neighboring cell list configuration module 101 and a neighboring cell list sending module 102.

The neighboring cell list configuration module 101 is configured to configure neighboring cell lists, where the neighboring cell lists are determined through cell feature information, and the cell feature information includes at least one of the following: whether a cell supports a TSC traffic, or whether a cell provides clock reference information. The neighboring cell list sending module 102 is configured to send at least one neighboring cell list to a UE through a SIB.

The apparatus for configuring a neighboring cell list provided by this embodiment is used for implementing the method for configuring a neighboring cell list provided by the embodiments of the present application. The implementation principles and technical effects of the apparatus for configuring a neighboring cell list provided by this embodiment are similar to those of the method for configuring a neighboring cell list provided by the embodiments of the present application, which will not be repeated herein.

In an exemplary embodiment, the neighboring cell list includes an intra-frequency cell list and/or an inter-frequency cell list, where the intra-frequency cell list is sent through SIB3, and the inter-frequency cell list is sent through SIB4.

Figure 11:
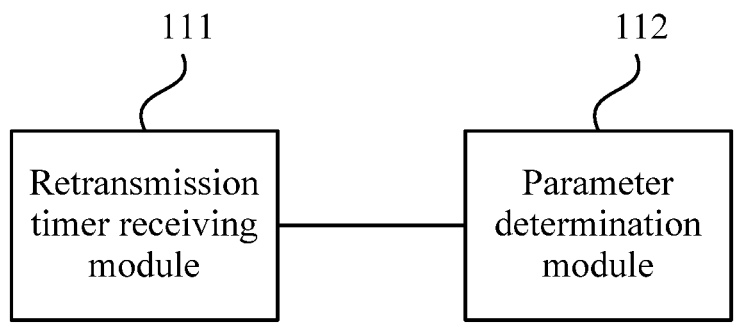
FIG. 11 is a structural diagram of an apparatus for determining a parameter provided by the present application.

In an exemplary embodiment, FIG. 11 is a structural diagram of an apparatus for determining a parameter provided by the present application. The apparatus may be applied to the case of determination of a short eDRX parameter of the RRC-Inactive state. The method may be performed by an apparatus for determining a parameter, and the apparatus for determining a parameter may be implemented by software and/or hardware and/or integrated into a base station.

As shown in FIG. 11, the apparatus for determining a parameter provided by the present application includes a retransmission timer receiving module 111 and a parameter determination module 112.

The retransmission timer receiving module 11 is configured to receive a retransmission timer sent by a core network, where the retransmission timer includes a NAS retransmission timer or an SMS retransmission timer. The parameter determination module 112 is configured to determine a short eDRX parameter of an RRC-Inactive state according to the retransmission timer.

The apparatus for determining a parameter provided by this embodiment is used for implementing the method for determining a parameter provided by the embodiments of the present application. The implementation principles and technical effects of the apparatus for determining a parameter provided by this embodiment are similar to those of the method for determining a parameter provided by the embodiments of the present application, which will not be repeated herein.

In an exemplary embodiment, the parameter determination module 112 is configured to determine a period length of the short eDRX parameter according to the retransmission timer, where the period length of the short eDRX parameter is less than or equal to a length of the retransmission timer.

In an exemplary embodiment, information of the NAS retransmission timer and information of the SMS retransmission timer are sent through the core network in at least one of the following manners.

When an initial context setup request is sent, the information of the NAS retransmission timer or the information of the SMS retransmission timer is sent through the core network; when a UE context restore response is sent, the information of the NAS retransmission timer or the information of the SMS retransmission timer is sent through the core network; when a handover request is sent, the information of the NAS retransmission timer or the information of the SMS retransmission timer is sent through the core network; or when a path handover request acknowledgement message is sent, the information of the NAS retransmission timer or the information of the SMS retransmission timer is sent through the core network.

Figure 12:
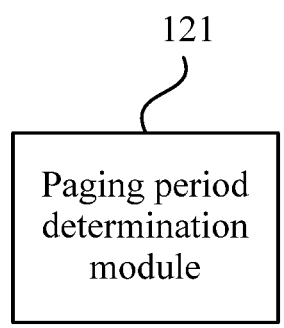
FIG. 12 is a structural diagram of another apparatus for determining measurement time provided by the present application.

In an exemplary embodiment, FIG. 12 is a structural diagram of another apparatus for determining measurement time provided by the present application. The apparatus may be applied to determination of a paging period. The apparatus may be performed by an apparatus for determining a parameter, and the apparatus for determining a parameter may be implemented by software and/or hardware and/or integrated into a base station.

As shown in FIG. 12, the apparatus for determining a parameter provided by the present application includes a paging period determination module 121.

The paging period determination module 121 is configured to determine a target paging period in an RRC-Inactive state based on an idle PTW, where the idle PTW window determines a location of a window by using an eDRX parameter in an idle mode.

The apparatus for determining a parameter provided by this embodiment is used for implementing the method for determining a parameter provided by the embodiments of the present application. The implementation principles and technical effects of the apparatus for determining a parameter provided by this embodiment are similar to those of the method for determining a parameter provided by the embodiments of the present application, which will not be repeated herein.

In an exemplary embodiment, the paging period determination module 121 is configured to, within the idle PTW, determine the shortest period among a RAN paging period configured in the RRC-Inactive state, a UE-specific paging period and a cell-default paging period as the target paging period; outside the idle PTW, determine the RAN paging period configured in the RRC-Inactive state as the target paging period; and within the idle PTW, determine the shortest period between the RAN paging period configured in the RRC-Inactive state and the UE-specific paging period as the target paging period.

In an exemplary embodiment, the RAN paging period configured in the RRC-Inactive state is configured by a base station for a UE through UE-dedicated signaling as an RRC-Inactive configuration parameter, the cell-default paging period is a paging period parameter broadcast by the base station to the UE, and the UE-specific paging period is a UE-specific idle DRX period sent by a core network to the UE after negotiation between the UE and the core network through a NAS.

Figure 13:
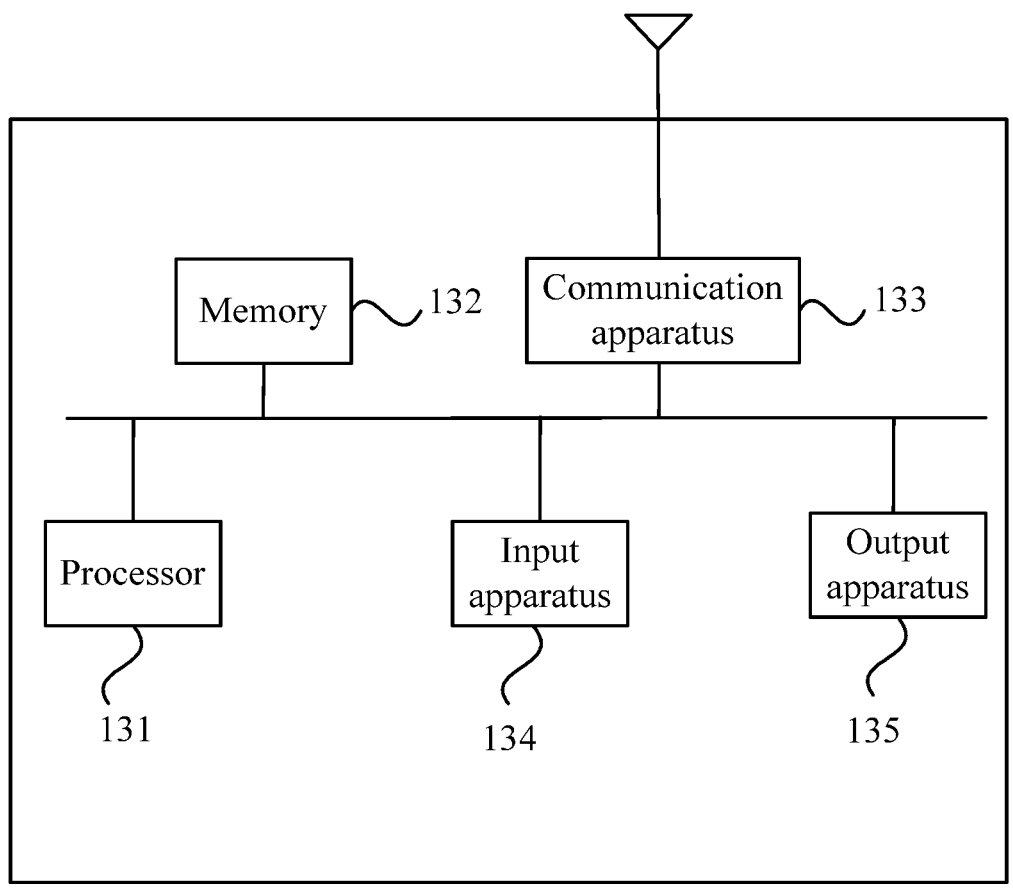
FIG. 13 is a structural diagram of a user device provided by the present application.

The embodiments of the present application further provide a user device. FIG. 13 is a structural diagram of a user device provided by the present application. As shown in FIG. 13, the user device provided by the present application includes one or more processors 131 and a memory 132. The number of the processor 131 in the user device may be one or more, and FIG. 13 is illustrated with one processor 131 as an example. The memory 132 is used for storing one or more programs, where the one or more programs are executed by the one or more processors 131 such that the one or more processors 131 perform the method as described in the embodiments of the present disclosure.

The user device further includes a communication apparatus 133, an input apparatus 134, and an output apparatus 135.

The processor 131, the memory 132, the communication apparatus 133, the input apparatus 134, and the output apparatus 135 in the user device may be connected via a bus or other means, with connection via a bus as an example in FIG. 13.

The input apparatus 134 may be used for receiving inputted digital or character information and generating key signal input related to user settings and function control of the user device. The output apparatus 135 may include display devices such as display screens.

The communication apparatus 133 may include a receiver and a transmitter. The communication apparatus 133 is configured to perform transceiving communication on information according to the control of the processor 131.

As a computer-readable storage medium, the memory 132 may be configured to store software programs and computer-executable programs and modules. The memory 132 may include a program storage region and a data storage region, where the program storage region may store an operating system and an application program required by at least one function while the data storage region may store data created depending on use of the equipment. Furthermore, the memory 132 may include a high speed random-access memory, and may also include a non-volatile memory such as at least one disk memory, flash memory or other non-volatile solid-state memories. In some examples, the memory 132 may include memories which are remotely disposed relative to the processor 131 and these remote memories may be connected to the device via a network. The examples of the preceding network include, but are not limited to, the Internet, an intranet, a local area network, a mobile communication network, and a combination thereof.

When the device in this embodiment is a UE, the processor 131 executes programs stored in the system memory 132 to perform various functional applications and data processing.

Therefore, for example, the processor 131 implements the method for determining measurement time provided by the embodiments of the present application, which includes the following.

Configuration information of an ANR is received, where the configuration information includes a measurement configuration parameter, an ANR measurement duration or an ANR measurement timer; ANR measurement is performed based on the configuration information; and when a first condition is satisfied, the ANR measurement is finished, where the first condition includes at least one of the following: the ANR measurement duration is reached, the ANR measurement timer expires, or an ANR measurement result is acquired.

The processor 131 may also implement the technical solutions provided by the embodiments of the present application. For the hardware structure and functions of the terminal, reference may be made to the content of the embodiments described above.

In another example, the processor 131 implements the method for determining a camped cell provided by the embodiments of the present application, which includes the following.

At least one neighboring cell list sent by a base station is received. A target neighboring cell list is determined from the at least one neighboring cell list based on terminal feature information, where the terminal feature information includes at least one of the following: whether a terminal supports a TSC traffic, or clock information required by a terminal to carry the TSC traffic.

In another example, the processor 131 implements the method for determining a parameter provided by the embodiments of the present application, which includes the following.

A target paging period in an RRC-Inactive state is determined based on an idle PTW, where the idle PTW window determines a location of a window by using an eDRX parameter in an idle mode.

When the device in this embodiment is a base station, the processor 131 executes programs stored in the system memory 132 to perform various functional applications and data processing.

Therefore, for example, the processor 131 implements the method for configuring a neighboring cell list provided by the embodiments of the present application, which includes the following.

Neighboring cell lists are configured, where the neighboring cell lists are determined through cell feature information, and the cell feature information includes at least one of the following: whether a cell supports a TSC traffic, or whether a cell provides clock reference information. At least one neighboring cell list is sent to a UE through a SIB.

In another example, the processor 131 implements the method for determining a parameter provided by the embodiments of the present application, which includes the following.

A retransmission timer sent by a core network is received, where the retransmission timer includes a NAS retransmission timer or an SMS retransmission timer. A short eDRX parameter of an RRC-Inactive state is determined according to the retransmission timer.

The processor 131 may also implement the technical solutions provided by the embodiments of the present application. For the hardware structure and functions of the terminal, reference may be made to the content of the embodiments described above.

The embodiments of the present application further provide a storage medium. The storage medium stores a computer program, where the computer program, when executed by a processor, performs the method of any one of the embodiments of the present application.

The method for determining measurement time, which is applied to a User Equipment, (UE), includes the following.

Configuration information of an ANR is received, where the configuration information includes a measurement configuration parameter, an ANR measurement duration or an ANR measurement timer; ANR measurement is performed based on the configuration information; and when a first condition is satisfied, the ANR measurement is finished, where the first condition includes at least one of the following: the ANR measurement duration is reached, the ANR measurement timer expires, or an ANR measurement result is acquired.

The method for determining a camped cell, which is applied to a UE, includes the following.

At least one neighboring cell list sent by a base station is received. A target neighboring cell list is determined from the at least one neighboring cell list based on terminal feature information, where the terminal feature information includes at least one of the following: whether a terminal supports a TSC traffic, or clock information required by a terminal to carry the TSC traffic.

The method for determining a parameter, which is applied to a UE, includes the following.

A target paging period in an RRC-Inactive state is determined based on an idle PTW, where the idle PTW window determines a location of a window by using an eDRX parameter in an idle mode.

The method for configuring a neighboring cell list, which is applied to a base station, includes the following.

Neighboring cell lists are configured, where the neighboring cell lists are determined through cell feature information, and the cell feature information includes at least one of the following: whether a cell supports a TSC traffic, or whether a cell provides clock reference information. At least one neighboring cell list is sent to a UE through a SIB.

The method for determining a parameter, which is applied to a base station, includes the following.

A retransmission timer sent by a core network is received, where the retransmission timer includes a NAS retransmission timer or an SMS retransmission timer. A short eDRX parameter of an RRC-Inactive state is determined according to the retransmission timer.

The above are only exemplary embodiments of the present application and are not intended to limit the scope of the present application.

The term UE encompasses any appropriate type of radio UE, such as a mobile phone, a portable data processing device, a portable web browser, or a vehicle-mounted mobile station.

In general, various embodiments of the present application may be implemented in hardware or special purpose circuits, software, logic or any combination thereof. For example, the above-mentioned embodiments, in some aspects, may be implemented in hardware while in other aspects, the embodiments may be implemented in firmware or software that may be executed by a controller, a microprocessor, or other computing devices, which is not limited thereto.

The embodiments of the present application may be implemented by computer program instructions executed by a data processor of a mobile device, such as in the processor entity, or by hardware, or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow in drawings of the present application may represent program steps, or interconnected logic circuits, modules, and functions, or a combination of program steps and logic circuits, modules and functions. The computer programs may be stored in a memory. The memory may be of any type suitable for a local technical environment and may be implemented using any suitable data storage technology, such as, but not limited to, a read-only memory (ROM), a random-access memory (RAM), and an optical memory device and system (digital video disc (DVD) or compact disc (CD)). The computer-readable storage medium may include a non-transitory storage medium. The data processor may be of any type suitable to the local technical environment, such as, but is not limited to, a general-purpose computer, a special purpose computer, a microprocessor, a digital signal processor (DSP), an application-specific integrated circuit (ASIC), a field-programmable gate array (FPGA), and a processor based on a multi-core processor architecture.

What is claimed is:

1. A method for determining a parameter, comprising:
   determining a target paging period in a radio resource control-inactive (RRC-Inactive) state based on an idle paging time window (PTW), wherein the idle PTW determines a location of a window by using an extended discontinuous reception (eDRX) parameter in an idle mode,
   wherein the determining the target paging period in the RRC-Inactive state based on the idle PTW comprises at least one of:
      within the idle PTW, determining a shortest period among a radio access network (RAN) paging period configured for the RRC-Inactive state, a user equipment (UE)-specific paging period and a cell-default paging period as the target paging period; and
      outside the idle PTW, determining the RAN paging period configured for the RRC-Inactive state as the target paging period.

2. A device comprising:
   at least one processor; and
   a memory, which is configured to store at least one program, wherein the at least one program, when executed by the at least one processor, enables the at least one processor to perform:
      determining a target paging period in a radio resource control-inactive (RRC-Inactive) state based on an idle paging time window (PTW), wherein the idle PTW determines a location of a window by using an extended discontinuous reception (eDRX) parameter in an idle mode;
   wherein the determining the target paging period in the RRC-Inactive state based on the idle PTW comprises at least one of:
      within the idle PTW, determining a shortest period among a radio access network (RAN) paging period configured for the RRC-Inactive state, a user equipment (UE)-specific paging period and a cell-default paging period as the target paging period; and
      outside the idle PTW, determining the RAN paging period configured for the RRC-Inactive state as the target paging period.

3. A non-transitory computer readable storage medium having stored thereon, at least one program, wherein the at least one program, when executed by at least one processor, enables the at least one processor to perform:
   determining a target paging period in a radio resource control-inactive (RRC-Inactive) state based on an idle paging time window (PTW), wherein the idle PTW determines a location of a window by using an extended discontinuous reception (eDRX) parameter in an idle mode;
   wherein the determining the target paging period in the RRC-Inactive state based on the idle PTW comprises at least one of:
      within the idle PTW, determining a shortest period among a radio access network (RAN) paging period configured for the RRC-Inactive state, a user equipment (UE)-specific paging period and a cell-default paging period as the target paging period; and
      outside the idle PTW, determining the RAN paging period configured for the RRC-Inactive state as the target paging period.

* * * * *